United States Patent
Yuan et al.

(10) Patent No.: US 12,535,080 B2
(45) Date of Patent: Jan. 27, 2026

(54) FAN FAULT DETECTION METHOD AND APPARATUS, COMPUTER DEVICE, AND STORAGE MEDIUM

(71) Applicant: SINENG ELECTRIC CO., LTD., Wuxi (CN)

(72) Inventors: Hong Yuan, Wuxi (CN); Aigang Li, Wuxi (CN); Fuwei Deng, Wuxi (CN); Qingwei Zhang, Wuxi (CN)

(73) Assignee: SINENG ELECTRIC CO., LTD., Wuxi (CN)

( * ) Notice: Subject to any disclaimer, the term of this patent is extended or adjusted under 35 U.S.C. 154(b) by 0 days.

(21) Appl. No.: 18/879,739

(22) PCT Filed: Apr. 20, 2023

(86) PCT No.: PCT/CN2023/089568
§ 371 (c)(1),
(2) Date: Dec. 27, 2024

(87) PCT Pub. No.: WO2024/001454
PCT Pub. Date: Jan. 4, 2024

(65) Prior Publication Data
US 2025/0257735 A1    Aug. 14, 2025

(30) Foreign Application Priority Data
Jun. 28, 2022 (CN) ............ 202210743982.8

(51) Int. Cl.
*F04D 27/00* (2006.01)
*F04D 25/16* (2006.01)

(52) U.S. Cl.
CPC ......... *F04D 27/001* (2013.01); *F04D 25/166* (2013.01); *F05D 2260/80* (2013.01)

(58) Field of Classification Search
CPC ... F04D 27/001; F04D 25/166; F05D 2260/80
See application file for complete search history.

(56) References Cited

U.S. PATENT DOCUMENTS

| | | | |
|---|---|---|---|
| 11,687,134 B2* | 6/2023 | Chen ............... | G06F 1/206 700/300 |
| 2017/0219239 A1 | 8/2017 | Lovicott et al. | |
| 2022/0269323 A1* | 8/2022 | He ................. | G06F 1/206 |

FOREIGN PATENT DOCUMENTS

| | | |
|---|---|---|
| CN | 102996482 A | 3/2013 |
| CN | 207543085 U | 6/2018 |
| CN | 114326990 A | 4/2022 |
| CN | 114635865 A | 6/2022 |
| CN | 115095544 A | 9/2022 |
| JP | 2006022686 A | 1/2006 |
| JP | 2007203318 A | 8/2007 |

* cited by examiner

*Primary Examiner* — Andrew J Marien
(74) *Attorney, Agent, or Firm* — Bayramoglu Law Offices LLC (57) ABSTRACT

A fan fault detection method and apparatus, a computer device, and a storage medium are provided. According to the fan fault detection method, a fan fault can be detected by using a multiplexer switch and one isolation component. A detection circuit is simple, and multiple groups of fan fault feedback signals can be detected simultaneously, reducing costs. Control signals are generated through self-oscillation, facilitating compatibility of different fan fault feedback signals.

6 Claims, 9 Drawing Sheets

FAN FAULT DETECTION METHOD AND APPARATUS, COMPUTER DEVICE, AND STORAGE MEDIUM

CROSS-REFERENCE TO THE RELATED APPLICATIONS

This application is the national phase entry of International Application No. PCT/CN2023/089568, filed on Apr. 20, 2023, which is based upon and claims priority to Chinese Patent Application No. 202210743982.8, filed on Jun. 28, 2022, the entire contents of which are incorporated herein by reference.

TECHNICAL FIELD

This application relates to the field of fan technologies, and in particular, to a fan fault detection method and apparatus, a computer device, and a storage medium.

BACKGROUND

In an air cooling device, a fan is used for external heat exchanging. Because it is easy to perform speed regulation control on a direct current fan, the direct current fan is widely used. For fan fault detection, a fan fault may be detected by using a fan fault output signal: a level output or a square wave output. Some fans have no fault output signal, and a fan current needs to be detected or a wind speed needs to be detected by using a sensor. Currently, there are two types: isolation-type detection and non-isolation-type detection. In the isolation-type detection, a fault signal is sent to a control system by using an isolation component. In the non-isolation-type detection, a fault signal may be directly sent to the control system. Currently, most fans need more refined detection of fan faults: stall, rotation speed abnormality, locating a faulty fan, and the like, to facilitate fan maintenance. Currently, it is simple to detect a single fan by using an isolation-type detection circuit. However, for a working condition of multiple fans, multiple groups of independent power supplies and isolation detection components are required, and detection costs are high. Moreover, more control resources are occupied. Currently, a non-isolation-type detection circuit is configured with a group of detection circuits for each fan, which are directly connected to the control system. Some fans have large interference, which affects detection precision and interferes with the control system. In addition, when the fan is faulty, it is easy to crash the control system.

SUMMARY

Embodiments of this application aim to provide a fan fault detection method and apparatus, a computer device, and a storage medium, so as to resolve a problem that for a working condition of multiple fans, multiple groups of independent power supplies and isolation detection components are required in an isolation-type detection circuit, and detection costs are high.

According to a first aspect, this application provides a fan fault detection method, including the following steps:
configuring a fan type and a rotation speed fault threshold;
calculating a fan fault signal frequency f and processing a fan feedback signal flip flag according to configurations of the fan type and the rotation speed fault threshold;
self-adapting to a cycle time of a single fan according to the fan fault signal frequency and the fan feedback signal flip flag;
determining a sequence of a current fan according to an actual cycle time of the single fan through counting by using a time base counter of a digital signal processor (DSP); and
determining a fan type of the current fan according to the fan sequence and the fan type configured during initialization, and determining a fan fault.

In some embodiments, the step of configuring a fan type and a rotation speed fault threshold specifically includes:
establishing a correspondence between a fan type and a rotation speed fault threshold, where each fan type corresponds to one rotation speed fault threshold.

In some embodiments, the step of calculating a fan fault signal frequency f and processing a fan feedback signal flip flag according to configurations of the fan type and the rotation speed fault threshold specifically includes:
calculating, by using an enhanced capture (ECAP) module of the DSP, a fan feedback signal frequency f according to the configurations of the fan type and the rotation speed fault threshold; and
processing, according to a rule, a flag indicating whether the fan feedback signal is flipped, where the rule is resetting the time base counter CTR when a capture event (CEVT) is triggered, and when no CEVT is triggered, keeping increasing the time base counter CTR to a switching frequency CPU_FRQ of the DSP and then starting counting from 0 again.

In some embodiments, the self-adapting to a cycle time of a single fan according to the fan fault signal frequency and the fan feedback signal flip flag specifically includes:
calculating a maximum group quantity of connected fans according to the fan fault signal frequency and the fan feedback signal flip flag, self-adapting to the cycle time of the single fan, and determining a start point of the cycle time of the single fan;
letting an actual cycle of the single fan be T1 and a design cycle of the single fan be T2, and introducing a coefficient K, where $$K = \frac{T1}{T2},$$

and K is consistency between the actual cycle and the design cycle of a feedback signal of the single fan; and
letting a switching frequency of the DSP be CPU_FRQ, setting a register CAP1 to capture a rising edge, setting a register CAP2 to capture a falling edge, setting a register CAP3 to capture a rising edge, and setting a register CAP4 to capture a falling edge, where
when an event CEVT1, an event CEVT2, an event CEVT3, and an event CEVT4 are triggered, captured values of the register CAP1, the register CAP2, the register CAP3, and the register CAP4 are respectively TS1, TS2, TS3, and TS4.

In some embodiments, the step of determining a sequence of a current fan according to an actual cycle time of the single fan through counting by using a time base counter of a DSP specifically includes:
counting from a cycle start point of the fan feedback signal, where when it is determined, according to time base counter t and a cycle Ts, that a count of the actual cycle of the single fan is K*N, the fan sequence is [t/(K*N)]+1; and determining a type of a fan in a corresponding sequence according to configuration information of a fan application.

To resolve the foregoing technical problem, this application further provides a fan fault detection apparatus, and the following technical solution is used, including:

a configuration module, configured to configure a fan type and a rotation speed fault threshold;

a calculation module, configured to calculate a fan fault signal frequency f and process a fan feedback signal flip flag according to configurations of the fan type and the rotation speed fault threshold;

a self-adaptive module, configured to self-adapt to a cycle time of a single fan according to the fan fault signal frequency and the fan feedback signal flip flag; and a positioning module, configured to determine a sequence of a current fan according to an actual cycle time of the single fan through counting by using a time base counter of a DSP.

In some embodiments, the calculation module includes an oscillator, a counter, a multiplexer switch, and an isolation component; a clock reference signal is generated through self-oscillation of the oscillator; the counter modulates the clock reference signal into a multi-bit binary signal; the multiplexer switch separately gates fault detection signals of different fans according to the binary signal; an output signal of the multiplexer switch passes through the isolation component; and then the fan fault signal frequency f is calculated and the fan feedback signal flip flag is processed.

According to a second aspect, this application further provides a computer device, including a memory and a processor. The memory stores computer-readable instructions, and the processor implements the steps of the foregoing fan fault detection method when executing the computer-readable instructions.

According to a third aspect, this application further provides a computer-readable storage medium. The computer-readable storage medium stores computer-readable instructions, and when the computer-readable instructions are executed by a processor, the steps of the foregoing fan fault detection method are implemented.

Compared with the conventional technology, this application mainly has the following beneficial effects: A fan fault can be detected by using the multiplexer switch and one isolation component. A detection circuit is simple, a quantity of used isolation components is small, and multiple groups of fan fault feedback signals can be detected simultaneously, reducing costs of the isolation components. Control signals are generated through self-oscillation, and there is no need for a control system to control gating of the multiplexer switch. A level-type feedback signal and a square-wave-type feedback signal can be detected, facilitating compatibility of different fan fault feedback signals.

BRIEF DESCRIPTION OF THE DRAWINGS

To describe the technical solutions in this application more clearly, the following briefly describes the accompanying drawings required for describing the embodiments of this application. Apparently, the accompanying drawings in the following descriptions merely show some embodiments of this application, and a person of ordinary skill in the art may still derive others drawings from these accompanying drawings without creative efforts.

DETAILED DESCRIPTION OF THE EMBODIMENTS

Unless otherwise defined, meanings of all technical and scientific terms used in this specification are the same as those usually understood by a person skilled in the art to which this application belongs. The terms used herein in this specification of this application are merely intended to describe specific embodiments but not intended to limit this application. The terms "include" and "have", and any variations thereof in the description and claims of this application and in the foregoing accompanying drawings are intended to cover non-exclusive inclusion. The terms "first", "second", and the like in the specification and claims of this application, or the foregoing accompanying drawings are used to distinguish different objects, and are not used to describe a particular sequence.

The "embodiment" mentioned herein means that specific features, structures, or characteristics described with reference to the embodiments may be included in at least one embodiment of this application. The phrase appearing at various locations in the specification does not necessarily refer to a same embodiment, nor is a separate or alternative embodiment mutually exclusive with another embodiment. A person skilled in the art explicitly and implicitly understands that the embodiments described in this specification may be combined with another embodiment.

To enable a person skilled in the art to better understand solutions in this application, the following clearly and completely describes the technical solutions in the embodiments of this application with reference to the accompanying drawings.

Figure 1:
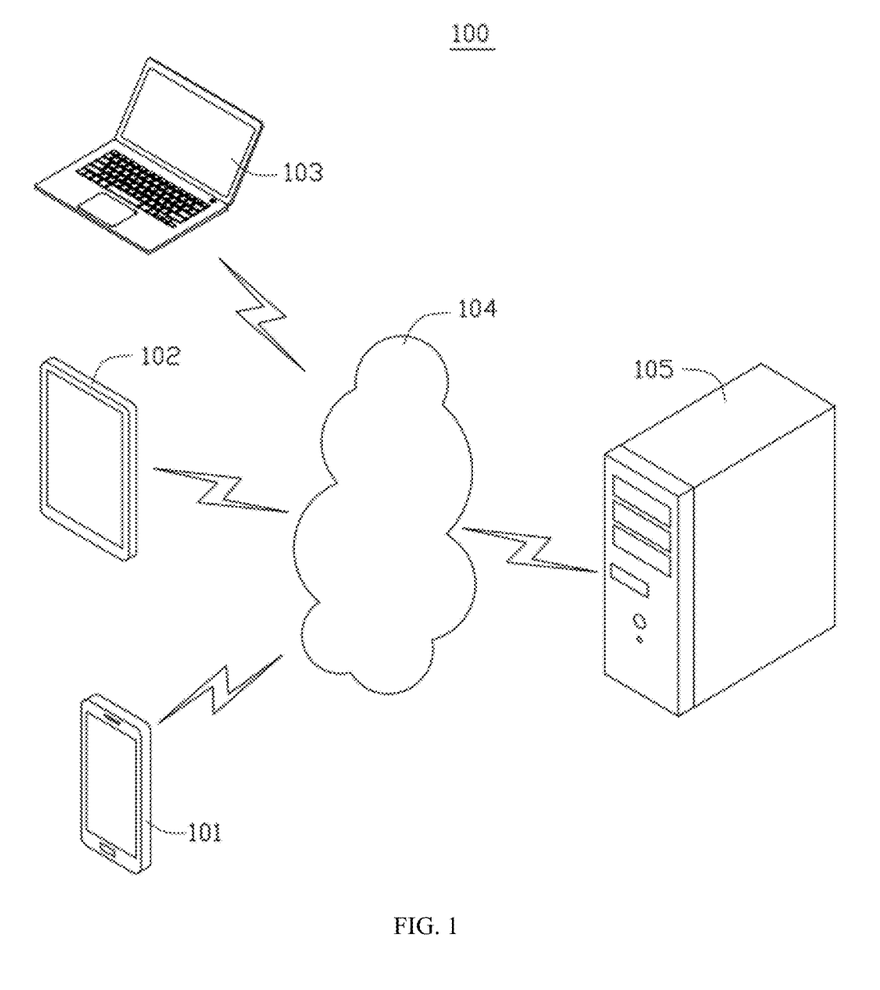
FIG. 1 is a diagram of an exemplary system architecture that can be applied to this application according to this application.

As shown in FIG. 1, a system architecture 100 may include a first terminal device 101, a second terminal device 102, a third terminal device 103, a network 104, and a server 105. The network 104 is a medium configured to provide a communication link among the first terminal device 101, the second terminal device 102, the third terminal device 103, and the server 105. The network 104 may include various connection types, for example, a wired communication link, a wireless communication link, or a fiber-optic cable.

A user may interact with the server 105 through the network 104 by using the first terminal device 101, the second terminal device 102, and the third terminal device 103, to receive or send a message or the like. Various communication client applications, for example, a web browser application, a shopping application, a search application, an instant messaging tool, a mailbox client, and social platform software, may be installed on the first terminal device 101, the second terminal device 102, and the third terminal device 103.

The first terminal device 101, the second terminal device 102, and the third terminal device 103 may be various electronic devices that have a display screen and that support web page browsing, including but not limited to a smartphone, a tablet computer, an e-book reader, an MP3 (Moving Picture Experts Group Audio Layer III, moving picture experts group audio layer 3) player, an MP4 (Moving Picture Experts Group Audio Layer IV, moving picture experts group audio layer 4) player, a laptop computer, a desktop computer, and the like.

The server 105 may be a server providing various services, for example, a background server providing support for pages displayed on the first terminal device 101, the second terminal device 102, and the third terminal device 103.

It should be noted that a fan fault detection method provided in an embodiment of this application is usually performed by the server/terminal device. Correspondingly, a fan fault detection apparatus is usually disposed in the server/terminal device.

It should be understood that a quantity of terminal devices, networks, and servers in FIG. 1 is merely an example. According to an implementation requirement, there may be any quantity of terminal devices, networks, and servers.

Embodiment 1

Figure 2:
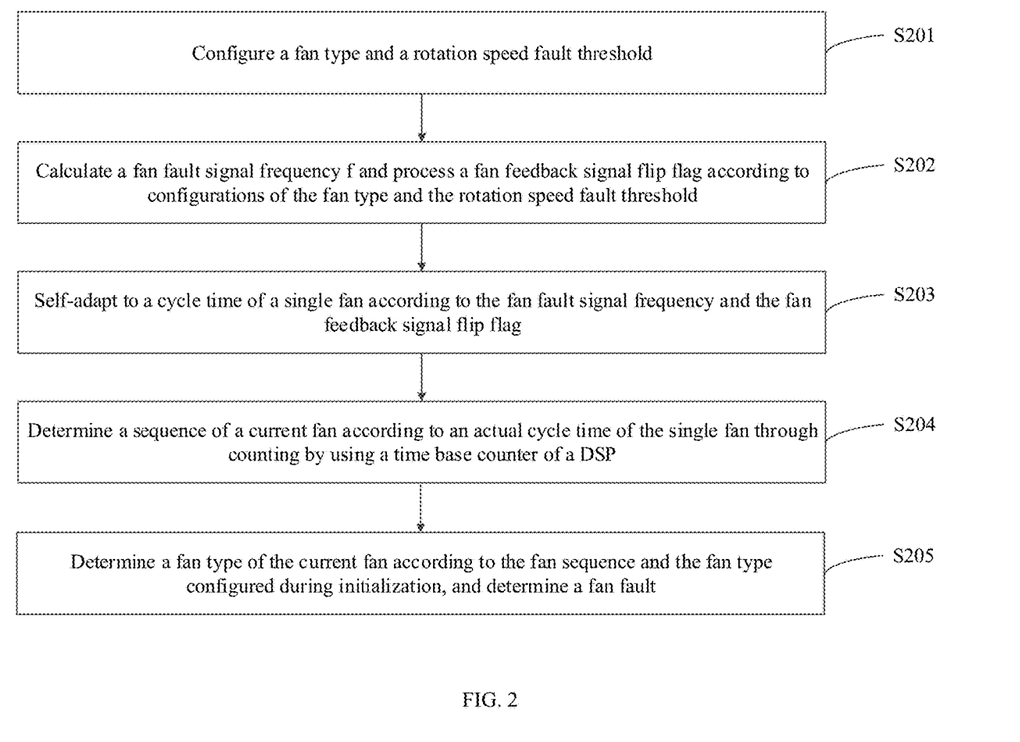
FIG. 2 is a flowchart of an embodiment of a fan fault detection method according to this application.

Still refer to FIG. 2. FIG. 2 is a flowchart of an embodiment of a fan fault detection method according to this application. The fan fault detection method includes the following steps:

Step S201: Configure a fan type and a rotation speed fault threshold.

In this embodiment, an electronic device (for example, the server/terminal device shown in FIG. 1) on which the fan fault detection method runs may receive a fan fault detection request in a wired connection manner or a wireless connection manner. It should be noted that the foregoing wireless connection manner may include but is not limited to a 3G/4G/5G connection, a WiFi connection, a Bluetooth connection, a WiMAX connection, a Zigbee connection, a UWB (ultra wideband) connection, and another wireless connection manner currently known or developed in the future.

The step of configuring a fan type and a rotation speed fault threshold specifically includes:
establishing a correspondence between a fan type and a rotation speed fault threshold, where each fan type corresponds to one rotation speed fault threshold. To more conveniently establish the correspondence between a fan type and a rotation speed fault threshold, in a specific implementation, descriptions of each fan type and the rotation speed fault threshold may also be established.

TABLE 1

| Fan type | Rotation speed fault threshold | Description |
|---|---|---|
| A | \ | No fan is configured |
| B | \ | A normal level output signal is at a high level, and an abnormal signal is at a low level |
| C | \ | A normal level output signal is at a low level, and an abnormal signal is at a high level |
| D | 0.8f1 | A normal level output signal is a square wave, a frequency is f1, and an abnormal signal is continuously at a high level or a low level |
| E | 0.8f2 | A normal level output signal is a square wave, a frequency is f2, and an abnormal signal is continuously at a high level or a low level |
| ... | ... | ... |

For example, fan types are A, B, C, D, and E, and corresponding rotation speed fault thresholds are respectively \ (namely, null), \ \, 0.8f1, and 0.8f2, where f1 refers to a frequency, and f2 refers to a frequency. Corresponding descriptions are respectively no fan is configured; a normal level output signal is at a high level, and an abnormal signal is at a low level; a normal level output signal is at a low level, and an abnormal signal is at a high level; a normal level output signal is a square wave, a frequency is f1, and an abnormal signal is continuously at a high level or a low level; and a normal level output signal is a square wave, a frequency is f2, and an abnormal signal is continuously at a high level or a low level.

Step S202: Calculate a fan fault signal frequency f and process a fan feedback signal flip flag according to configurations of the fan type and the rotation speed fault threshold.

In this embodiment, the step specifically includes:
calculating, by using an ECAP module of a DSP, a fan feedback signal frequency according to the configurations of the fan type and the rotation speed fault threshold;
processing, according to a rule, a flag indicating whether the fan feedback signal is flipped, where the rule is resetting a time base counter CTR when an event CEVT is triggered, and that the time base counter CTR counts from 0 again when the fan feedback signal frequency is less than 1; and
letting a switching frequency of the DSP be CPU_FRQ, setting a register CAP1 to capture a rising edge, setting a register CAP2 to capture a falling edge, setting a register CAP3 to capture a rising edge, and setting a register CAP4 to capture a falling edge, where when an event CEVT1, an event CEVT2, an event CEVT3, and an event CEVT4 are triggered, captured values of the register CAP1, the register CAP2, the register CAP3, and the register CAP4 are respectively TS1, TS2, TS3, and TS4.

Figure 3:
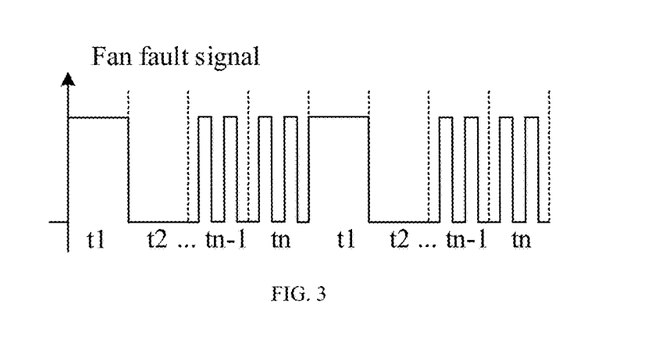
FIG. 3 is a diagram of a time sequence of a fault signal received by a control system in a fan fault detection method according to this application.

FIG. 3 is a diagram of a time sequence of a fault signal received by a control system in a fan fault detection method according to this application. In this embodiment, the control system may be understood as a system that is used to detect fan fault logic and that uses a DSP as a processing core, and includes a corresponding hardware peripheral circuit and software. The peripheral circuit includes a DSP minimum system, a power supply circuit, a communication circuit, and the like. A GPIO pin of the DSP receives a fan fault signal and detects a fan fault through logic processing. As shown in FIG. 3, a horizontal coordinate is time t; t1, t2, ..., tn−1, tn, and the like indicate time of each fan cycle, and serial numbers 1, 2, ..., n−1, and n respectively correspond to serial numbers of fans. For a signal received from the DSP, a vertical coordinate may be a voltage of the GPIO pin of the DSP, up to 3.3 V, and in this case, a unit is V; or the vertical coordinate may be logic high (1) or logic low (0), and in this case, there is no unit.

Figure 4:
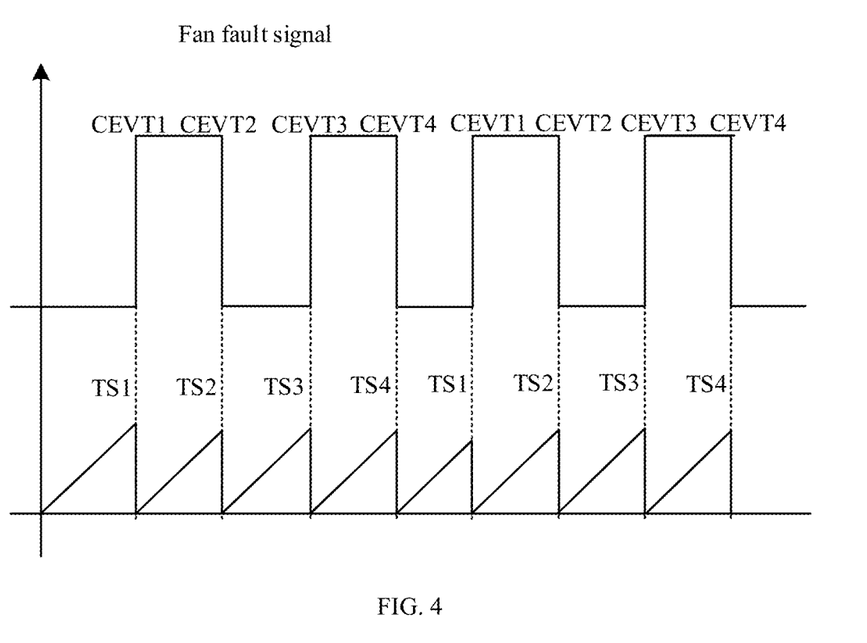
FIG. 4 is a schematic diagram of a fan fault signal in a fan fault detection method according to this application.

FIG. 4 is a schematic diagram of a fan fault signal in a fan fault detection method according to this application. As shown in FIG. 4, a horizontal coordinate is time t. For a signal received from the DSP, a vertical coordinate, namely, a vertical coordinate of a square wave in the figure, may be a voltage of the GPIO pin of the DSP, up to 3.3 V, and in this case, a unit is V; or the vertical coordinate may be logic high (1) or logic low (0), and in this case, there is no unit. A triangular wave in the figure represents the time base counter CTR of the ECAP module, and in this case, the vertical coordinate has no unit. According to a configuration of software for the ECAP module, when CAPx PIN levels (namely, fan fault signals) are in sequence from low to high, from high to low, from low to high, and from high to low, the event CEVT1, the event CEVT2, the event CEVT3, and the event CEVT4 are triggered in sequence. When the event CEVT1 is triggered, the time base counter CTR of the ECAP module is assigned to the register CAP1 and reset. Operations of the register CAP2, the register CAP3, and the register CAP4 each are the same as that of the register CAP1. TS1, TS2, TS3, and TS4 are respectively equal to values of the register CAP1, the register CAP2, the register CAP3, and the register CAP4. CPU_FRQ is a main frequency of the DSP, and is also a maximum value of the time base counter CTR of the ECAP module. If it exceeds CPU_FRQ, counting starts from 0 again. When a total count of the CTR reaches CPU_FRQ, time experiences 1 second. TS2+TS3 is a total counter value of one cycle, f=(CPU_FRQ)/(TS2+TS3), and is a signal frequency, and a unit is Hz.

Figure 5:
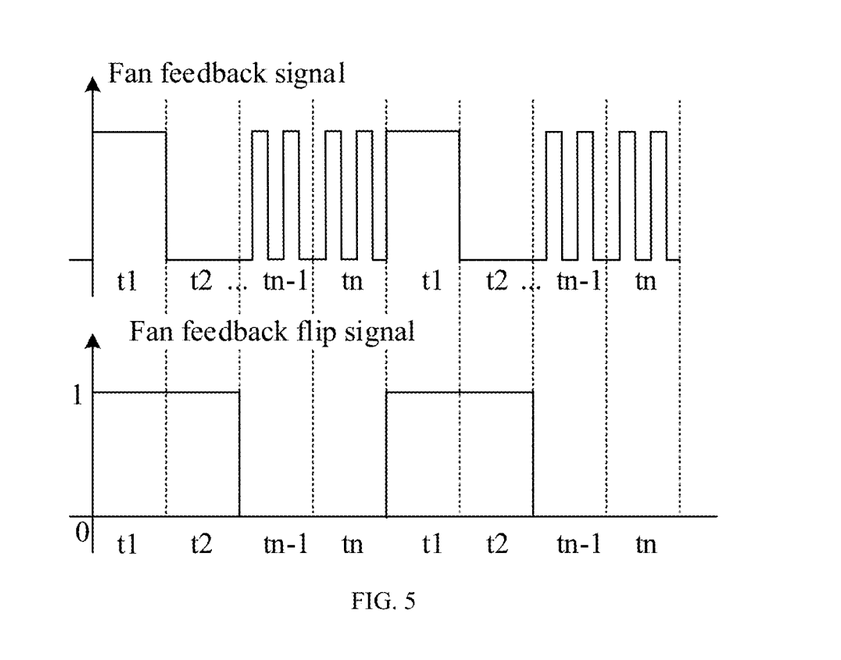
FIG. 5 is a schematic diagram of a fan feedback signal and a fan feedback flip signal in a fan fault detection method according to this application.

FIG. 5 is a schematic diagram of a fan feedback signal and a fan feedback flip signal in a fan fault detection method according to this application. FIG. 5 is used to describe a relationship between a fan feedback flip signal and a fan feedback signal. The fan feedback signal is a signal sent by the isolation component to the control system. As shown in FIG. 5, a horizontal coordinate of a fan feedback signal is time t. For a signal received from the DSP, a vertical coordinate, namely, a vertical coordinate of a square wave in the figure, may be a voltage of the GPIO pin of the DSP, up to 3.3 V, and in this case, a unit is V; or the vertical coordinate may be logic high (1) or logic low (0), and in this case, there is no unit. The fan feedback flip signal may be understood as whether the fan feedback signal is flipped within a cycle. If the fan feedback signal is flipped, the fan feedback flip signal is 0; or if the fan feedback signal is not flipped, the fan feedback flip signal is 1. Whether the fan feedback signal is flipped within a cycle may be determined according to the time base counter CTR of the ECAP module. When the CTR is greater than a specific value (if the fan feedback signal is flipped, the value is set to 0), it is considered that the fan feedback signal is not flipped. A vertical coordinate may be logic high (1) or logic low (0), and in this case, there is no unit.

Step S203: Self-adapt to a cycle time of a single fan according to the fan fault signal frequency and the fan feedback signal flip flag.

In this embodiment, the step specifically includes:
calculating a maximum group quantity of connected fans according to the fan fault signal frequency and the fan feedback signal flip flag, self-adapting to the cycle time of the single fan, and determining a start point of the cycle time of the single fan; and
letting an actual cycle of the single fan be T1 and a design cycle of the single fan be T2, and introducing a coefficient K, where $$K = \frac{T1}{T2},$$

and K is consistency between the actual cycle and the design cycle of a feedback signal of the single fan.

Step S204: Determine a sequence of a current fan according to an actual cycle time of the single fan through counting by using the time base counter of the DSP.

In this embodiment, the step specifically includes:
counting from a cycle start point of the fan feedback signal, where
when it is determined, according to time base counter t and a cycle Ts, that a count of the actual cycle of the single fan is K*N, the fan sequence is [t/(K*N)]+1; and
determining a type of a fan in a corresponding sequence according to configuration information of a fan application.

Figure 6:
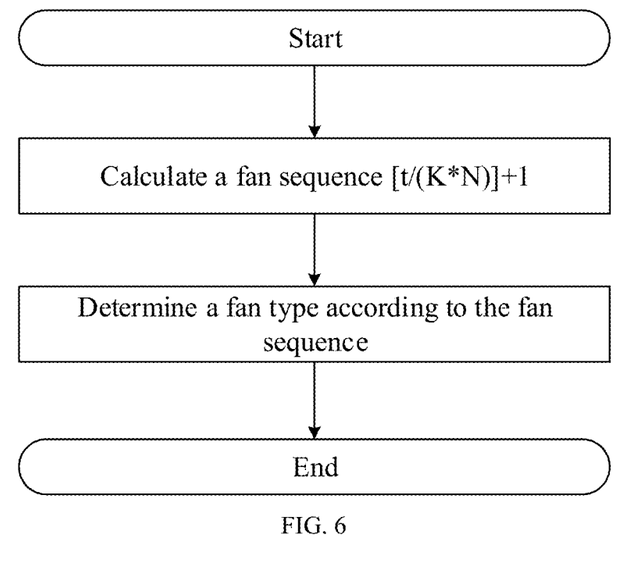
FIG. 6 is a flowchart of determining a fan sequence according to a time base counter t in a fan fault detection method according to this application.

FIG. 6 is a flowchart of determining a fan sequence according to a time base counter t in a fan fault detection method according to this application. In the fan feedback signal, T1 represents time of a signal corresponding to a fan 1, T2 represents time of a signal corresponding to a fan 2, and the like. The fan sequence refers to 1, 2, ..., and n in t1, t2, ..., and tn, namely, a number of a fan. For example, when the time base cycle is 1 ms, the time base counter t=10 represents 10th ms. For example, the design cycle of the feedback signal of the single fan is T2=1 second, and the actual cycle of the feedback signal of the single fan is T1-0.9 second due to an error such as temperature precision. In this case, $$K = \frac{T1}{T2}$$

represents the consistency between the time base cycle and the design cycle of the feedback signal of the single fan. N=1 s/1 ms=1000 represents a count when the design cycle of the feedback signal of the single fan is T2 time. K*N is a count when the actual cycle of the feedback signal of the single fan is T1 time.

For the fan sequence [t/(K*N)]+1, for example, t starts counting from 0 until nt ends and restarts counting from 0. [ ] is a rounding operator, and when 0<t<K*N, [t/(K*N)]+1=1. In this case, a first fan is determined, and so on.

Step S205: Determine a fan type of the current fan according to the fan sequence and the fan type configured during initialization, and determine a fan fault.

Figure 7:
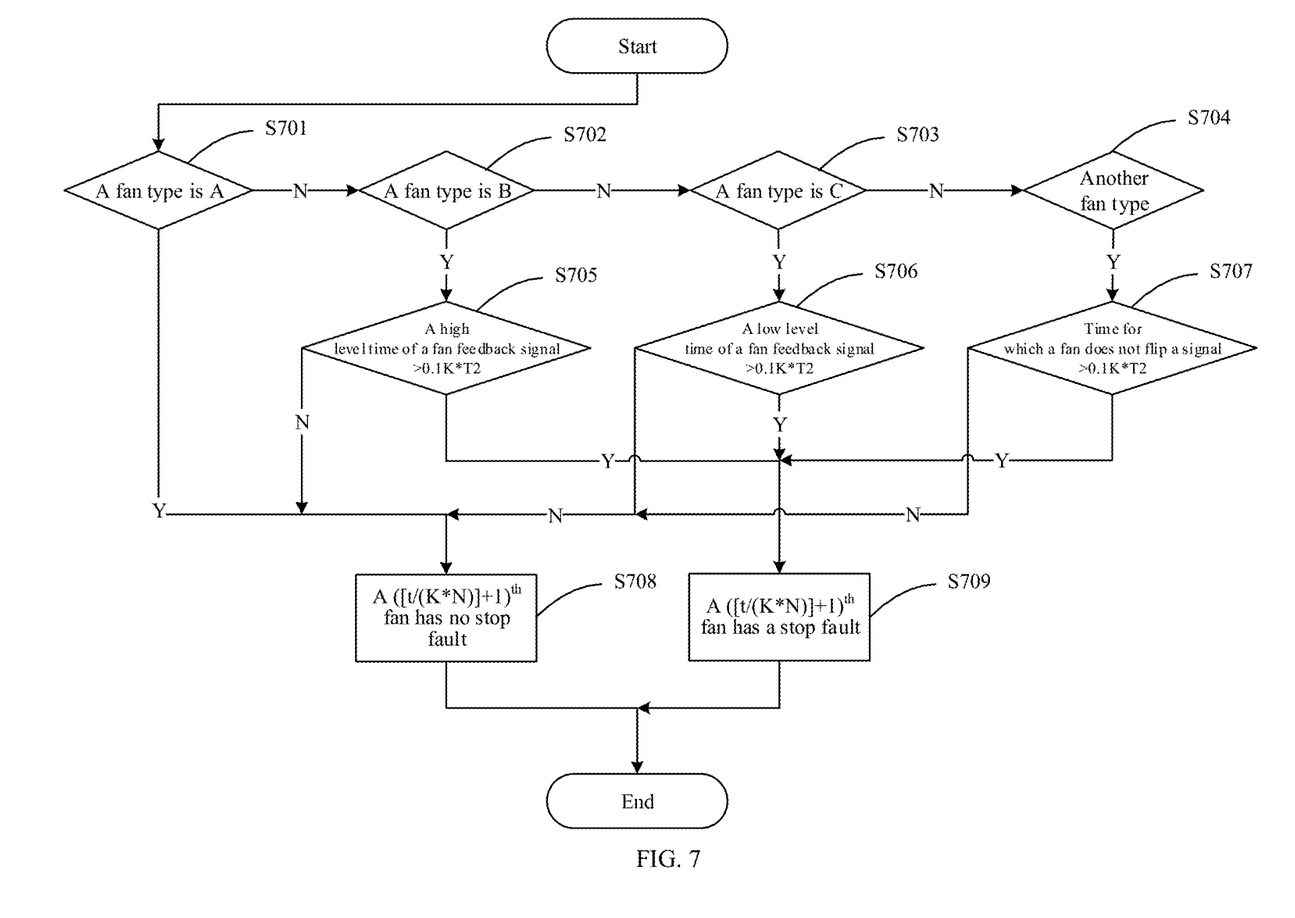
FIG. 7 is a flowchart of fan stop fault detection in a fan fault detection method according to this application.

Fan faults include fan stop fault, fan rotation speed fault, and the like. FIG. 7 is a flowchart of fan stop fault detection in a fan fault detection method according to this application. As shown in FIG. 7, a method for detecting a fan stop fault includes the following steps:

S701: Determine whether a fan type is A; and if no, perform step S702, or if yes, perform step S708.

S702: Determine whether the fan type is B; and if no, perform step S703, or if yes, perform step S705.

S703: Determine whether the fan type is C; and if no, perform step S704, or if yes, perform step S706.

S704: Determine whether the fan type is another fan type; and if yes, perform step S707.

S705: Determine whether a high level time of a fan feedback signal is greater than 0.1K*T2; and if yes, perform step S709, or if no, perform step S708.

S706: Determine whether a low level time of a fan feedback signal is greater than 0.1K*T2; and if yes, perform step S709, or if no, perform step S708.

S707: Determine whether time for which the fan does not flip a signal is greater than 0.1K*T2; and if yes, perform step S709, or if no, perform step S708.

S708: Determine that a ([t/(K*N)]+1)th fan has no stop fault.

S709: Determine that a ([t/(K*N)]+1)th fan has a stop fault.

Figure 8:
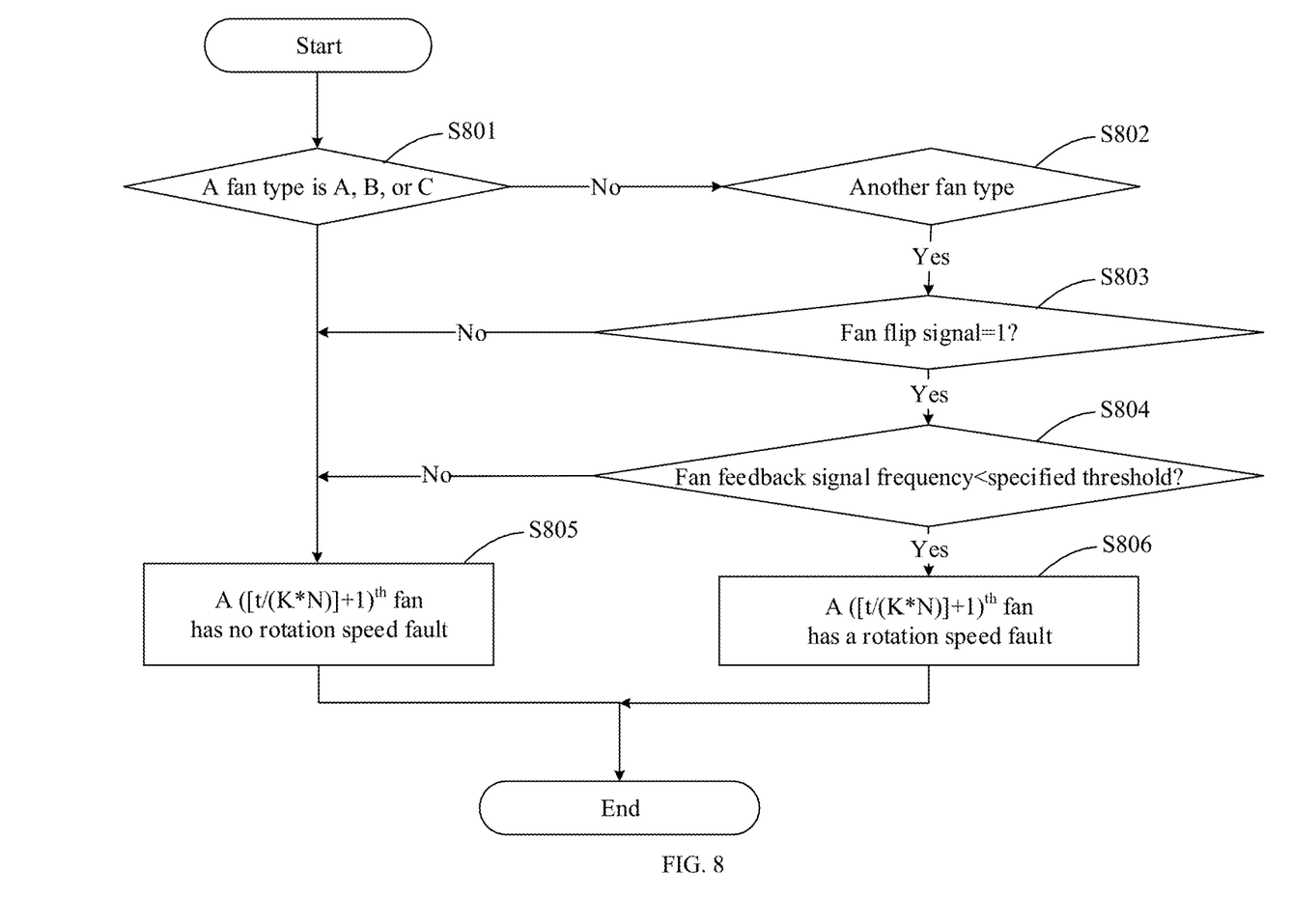
FIG. 8 is a flowchart of fan rotation speed fault detection in a fan fault detection method according to this application.

FIG. 8 is a flowchart of fan rotation speed fault detection in a fan fault detection method according to this application. As shown in FIG. 8, a method for detecting a fan rotation speed fault includes the following steps:

S801: Determine whether a fan type is A, B, or C; and if no, perform step S802, otherwise, perform step S805.

S802: Determine whether a fan type is another type; and if yes, perform step S803.

S803: Determine whether a fan flip signal is equal to 1; and if yes, perform step S804.

S804: Determine whether a fan feedback signal frequency is less than a specified threshold; and if yes, perform step S806.

S805: Determine that a ([t/(K*N)]+1)th fan has no rotation speed fault.

S806: Determine that a ([t/(K*N)]+1)th fan has a rotation speed fault.

Figure 9:
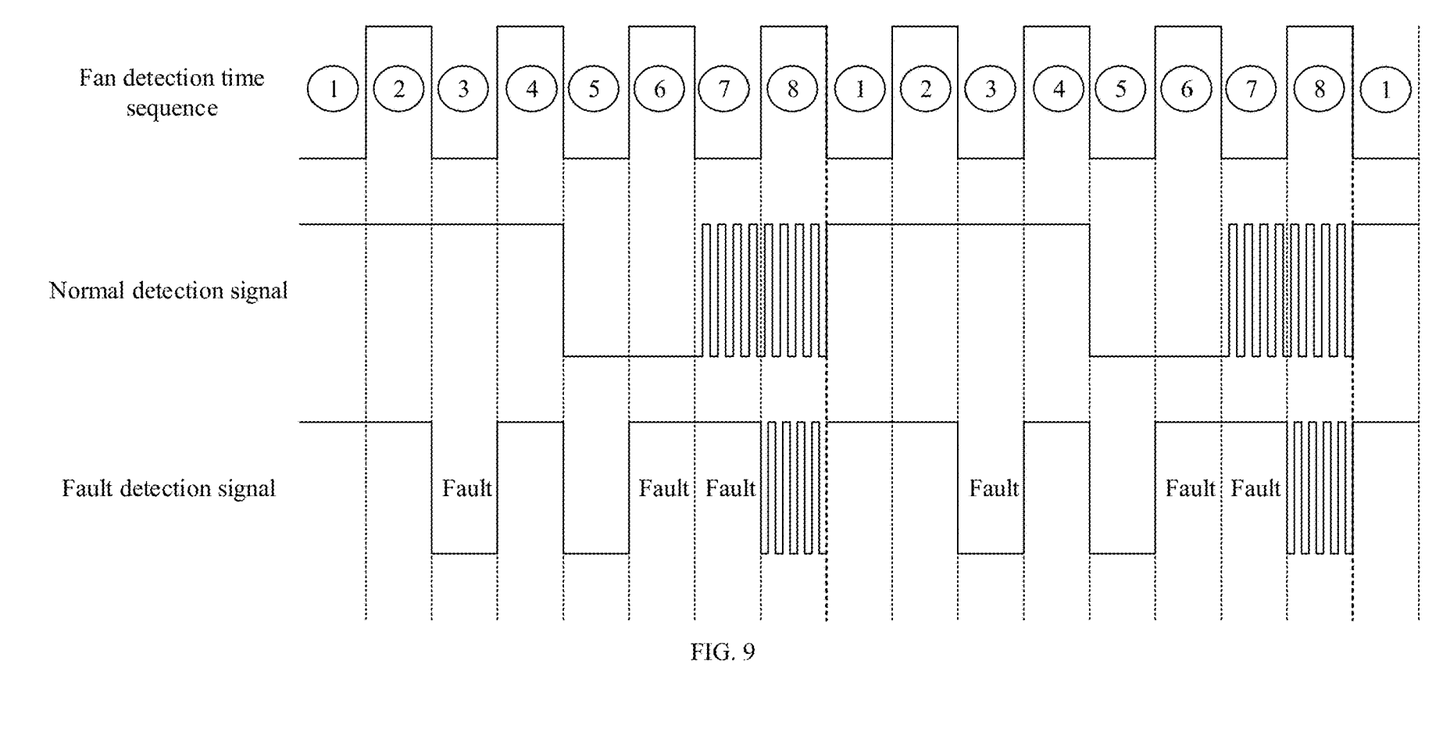
FIG. 9 is a schematic diagram of a fan detection time sequence, a normal detection signal, and a fault detection signal in a fan fault detection method according to this application.

FIG. 9 is a schematic diagram of a fan detection time sequence, a normal detection signal, and a fault detection signal in a fan fault detection method according to this application. As shown in FIG. 9, it is assumed that in fan serial numbers 1 to 8, the fan serial numbers 1 to 4 are of a fan type B, the fan serial numbers 5 and 6 are of a fan type C, and the fan serial numbers 7 and 8 are of a fan type D. The fan serial number 3 is of the fan type B, and in this case, a normal detection signal should be at a high level, but it is detected as a low level, and therefore there is a fault signal. The fan 6 is of the fan type C, and in this case, a normal detection signal should be at a low level, but it is detected as a high level, and therefore there is a fault signal. The fan 7 is of the fan type D, and in this case, normal detection is a high-frequency square-wave signal, but it is detected as a high level, and therefore there is a fault signal.

If there are only three fans, a fan type of a fan 1 is C, a fan type of a fan 2 is D, and a fan type of a fan 3 is E, a group of logic of four fault signals needs to be designed. A type of a fan 4 is A. In this case, t=4N, n fans may also be obtained, and a value of t is a value that is of a second power closest to 2 and that is multiplied by N.

In this application, the fan fault can be detected by using a multiplexer switch and one isolation component. A detection circuit is simple, a quantity of used isolation components is small, and multiple groups of fan fault feedback signals can be detected simultaneously, reducing costs of the isolation components. Control signals are generated through self-oscillation, and there is no need for the control system to control gating of the multiplexer switch. A level-type feedback signal and a square-wave-type feedback signal can be detected, facilitating compatibility of fans having different fault feedback signals.

This application can be applied to numerous general or dedicated computer system environments or configurations. For example, a personal computer, a server computer, a handheld device or a portable device, a tablet device, a multi-processor system, a microprocessor-based system, a set-top box, a programmable consumer electronic device, a network PC, a small-scale computer, a large-scale computer, and a distributed computing environment that includes any of the foregoing systems or devices. This application may be described in the general context of computer-executable instructions, such as a program module, executed by a computer. Generally, the program module includes a routine, a program, an object, a component, a data structure, and the like that perform a specific task or implement a specific abstract data type. This application may alternatively be practiced in distributed computing environments, and in these distributed computing environments, a task is performed by a remote processing device connected by using a communication network. In a distributed computing environment, program modules may be located in local and remote computer storage media including storage devices.

A person of ordinary skill in the art can understand that all or some of processes for implementing the methods of the foregoing embodiments can be completed by instructing relevant hardware through computer-readable instructions. The computer-readable instructions may be stored in a computer-readable storage medium. When the program is executed, processes of the embodiments of the foregoing methods may be included. The foregoing storage medium may be a non-volatile storage medium such as a magnetic disk, an optical disc, and a read-only memory (Read-Only Memory, ROM), a random access memory (Random Access Memory, RAM), or the like.

It should be understood that although the steps in the flowcharts of the accompanying drawings are shown in sequence as indicated by arrows, these steps are not necessarily performed in sequence as indicated by arrows. Unless explicitly stated herein, the execution of these steps is not strictly limited in sequence, and these steps may be executed in other sequences. Moreover, at least some steps in the flowcharts of the accompanying drawings may include a plurality of substeps or a plurality of stages, which are not necessarily executed at a same moment, but may be executed at different moments. The execution order of these substeps or stages is not necessarily sequential, and these substeps or stages may be executed alternately with other steps or at least some substeps or stages of other steps.

Embodiment 2

Figure 10:
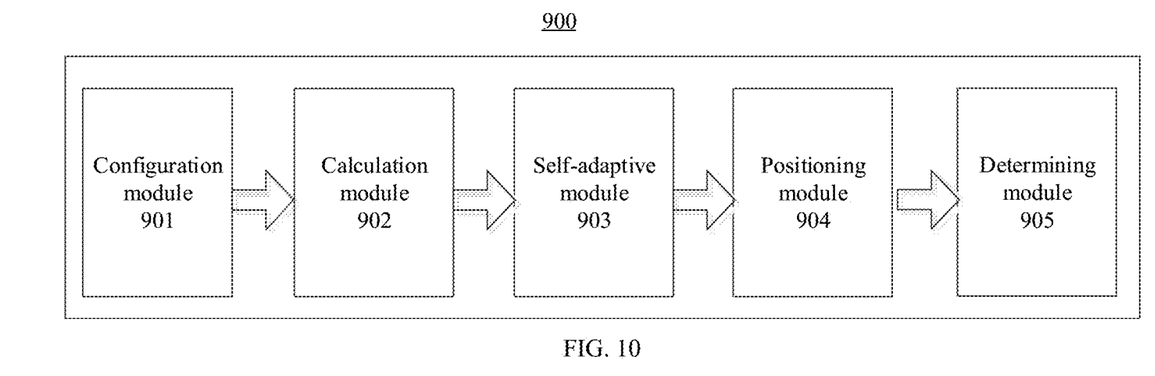
FIG. 10 is a schematic diagram of a structure in an embodiment of a fan fault detection apparatus according to this application.

Referring to FIG. 10, as an implementation of the foregoing method shown in FIG. 2, this application provides an embodiment of a fan fault detection apparatus. The apparatus embodiment corresponds to the method embodiment shown in FIG. 2. The apparatus may be specifically applied to various electronic devices.

As shown in FIG. 10, a fan fault detection apparatus 900 described in this embodiment includes a configuration module 901, a calculation module 902, a self-adaptive module 903, a positioning module 904, and a determining module 905.

The configuration module 901 is configured to configure a fan type and a rotation speed fault threshold.

The calculation module 902 is configured to calculate a fan fault signal frequency f and process a fan feedback signal flip flag according to configurations of the fan type and the rotation speed fault threshold.

The self-adaptive module 903 is configured to self-adapt to a cycle time of a single fan according to the fan fault signal frequency and the fan feedback signal flip flag.

The positioning module 904 is configured to determine a sequence of a current fan according to an actual cycle time of the single fan through counting by using a time base counter of a DSP.

The determining module 905 is configured to determine a fan type of the current fan according to the fan sequence and the fan type configured during initialization, and determine a fan fault.

Figure 11:
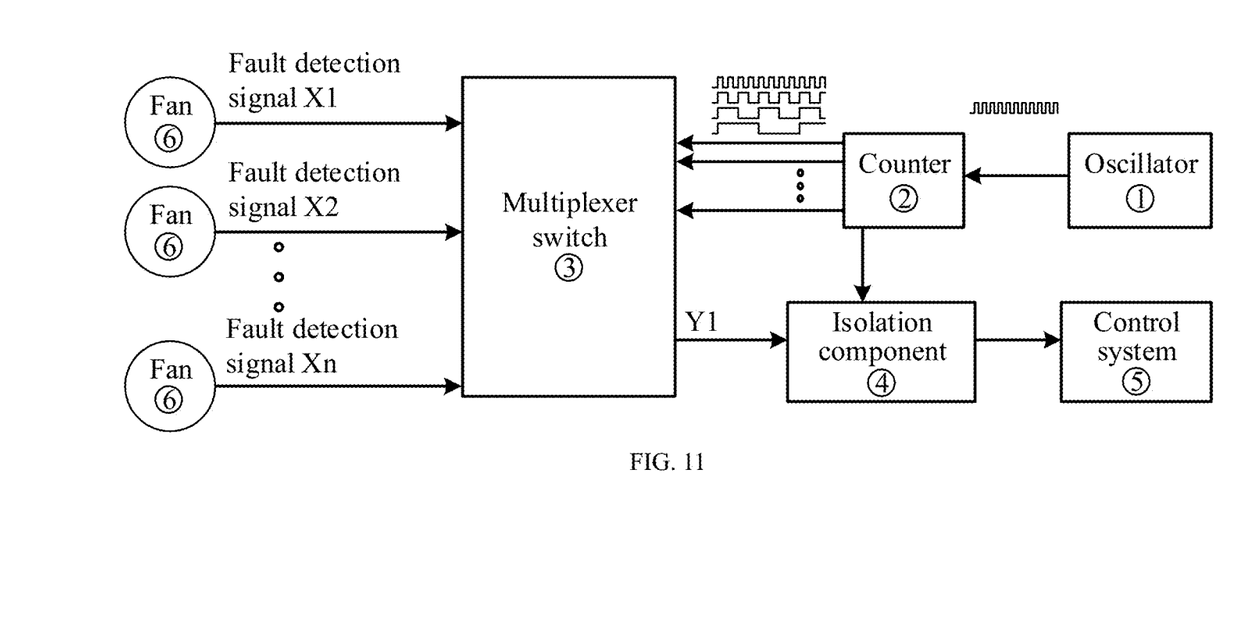
FIG. 11 is a diagram of a detection principle of a fan fault detection apparatus according to this application.

FIG. 11 is a diagram of a detection principle of a fan fault detection apparatus according to this application. As shown in FIG. 11, the calculation module may include an oscillator, a counter, a multiplexer switch, and an isolation component; a clock reference signal is generated through self-oscillation of the oscillator; the counter modulates the clock reference signal into a multi-bit binary signal; the multiplexer switch separately gates fault detection signals of different fans according to the binary signal; an output signal of the multiplexer switch passes through the isolation component; and then the fan fault signal frequency f is calculated and the fan feedback signal flip flag is processed.

In this embodiment, the clock reference signal can be generated through self-oscillation. A sampling counter modulates the clock reference signal into the multiple-bit binary signal. The multiplexer switch separately gates the fault detection signals of the different fans according to the binary signal at a control end. The output signal of the multiplexer switch is sent to a control system by using the isolation component for logical determining processing. No gating control signal needs to be output by the control system, reducing a quantity of isolation components. Multiple groups of fan faults can be detected by using only one isolation component.

The apparatus can detect a level-type feedback signal, and can also detect a square-wave-type feedback signal, facilitating compatibility of fans. When the square-wave-type feedback signal is detected, faults such as fan rotation speed abnormality may be determined.

The apparatus can detect multiple groups of fan fault signals, for example, when 2-bit binary data is used, $2^2=4$ groups of fans may be detected, or when 3-bit binary data is used, $2^3=8$ groups of fans may be detected. When fans are not fully connected, a fan sequence may be determined by using a vacant fan. When fans are fully connected, the output signal of the counter may be sent to the control system by using the isolation component to determine a fan detection sequence.

In this embodiment, the fan fault can be detected by using the multiplexer switch and the isolation component. A detection circuit is simple, a quantity of used isolation components is small, and multiple groups of fan fault feedback signals can be detected simultaneously, reducing costs of the isolation components. Control signals are generated through self-oscillation, and there is no need for the control system to control gating of the multiplexer switch. The level-type feedback signal and the square-wave-type feedback signal can be detected, facilitating compatibility of different fan fault feedback signals.

Embodiment 3

To resolve the foregoing technical problem, an embodiment of this application further provides a computer device.

Figure 12:
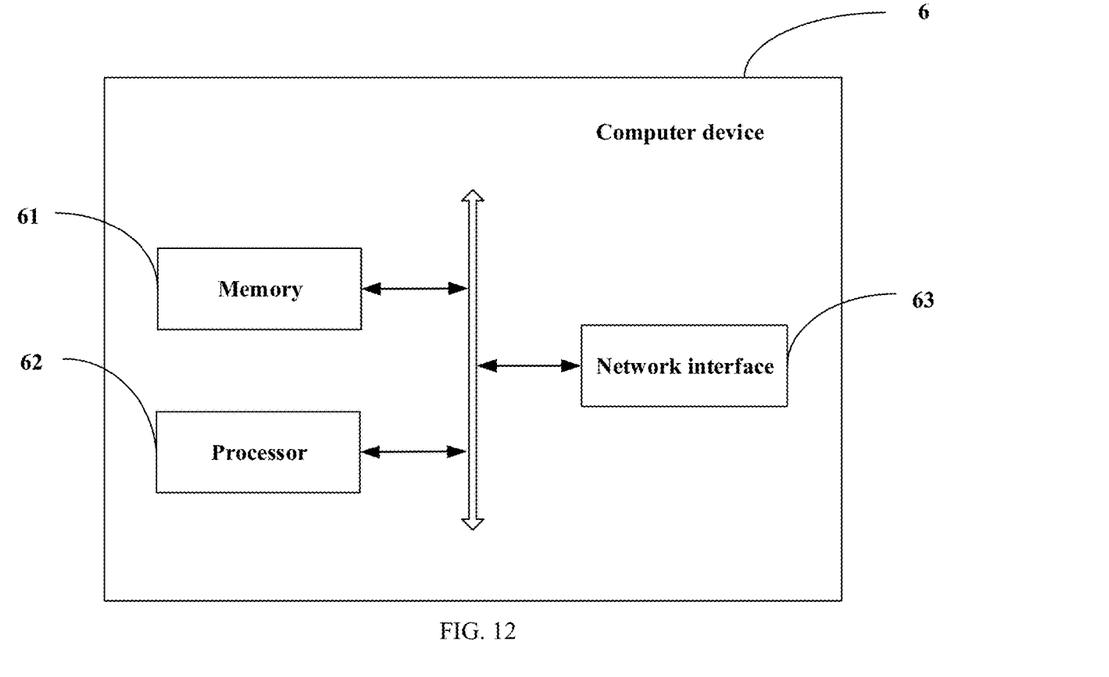
FIG. 12 is a schematic diagram of a structure in an embodiment of a computer device according to this application.

For details, refer to FIG. 12. FIG. 12 is a block diagram of a basic structure of a computer device according to an embodiment.

The computer device 6 includes a memory 61, a processor 62, and a network interface 63 that are communicatively connected to each other by using a system bus. It should be noted that only the computer device 6 with components of the memory 61, the processor 62, and the network interface 63 is shown in the figure. However, it should be understood that implementation of all the shown components is not required, and more or fewer components may alternatively be implemented. A person skilled in the art may understand that the computer device herein is a device that can automatically perform numerical calculation and/or information processing according to preset or stored instructions, and hardware of the device includes but is not limited to a microprocessor, an application specific integrated circuit (Application Specific Integrated Circuit, ASIC), a field-programmable gate array (Field-Programmable Gate Array, FPGA), a digital signal processor (Digital Signal Processor, DSP), an embedded device, and the like.

The computer device may be a computing device, for example, a desktop computer, a notebook computer, a palm-top computer, or a cloud server. The computer device may interact with a user by using a keyboard, a mouse, a remote control, a touchpad, or a voice control device.

The memory 61 includes at least one type of readable storage medium. The readable storage medium includes a flash memory, a hard disk, a multimedia card, a card-type storage (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 61 may be an internal storage unit of the computer device 6, for example, a hard disk or an internal memory of the computer device 6. In some other embodiments, the memory 61 may alternatively be an external storage device of the computer device 6, for example, a plug-in hard disk, a smart media card (Smart Media Card, SMC), a secure digital (Secure Digital, SD) card, or a flash card (Flash Card) that is configured on the computer device 6. Certainly, the memory 61 may alternatively include both an internal storage unit and an external storage device of the computer device 6. In this embodiment, the memory 61 is usually configured to store an operating system and various application software installed in the computer device 6, for example, computer-readable instructions of the fan fault detection method. In addition, the memory 61 may be further configured to temporarily store various types of data that has been output or is to be output.

The processor 62 may be a central processing unit (Central Processing Unit, CPU), a controller, a microcontroller, a microprocessor, or another data processing chip in some embodiments. The processor 62 is usually configured to control an overall operation of the computer device 6. In this embodiment, the processor 62 is configured to run the computer-readable instructions stored in the memory 61 or process data, for example, run computer-readable instructions of the fan fault detection method.

The network interface 63 may include a wireless network interface or a wired network interface, and the network interface 63 is usually configured to establish a communication connection between the computer device 6 and another electronic device.

In this embodiment, a fan fault can be detected by using a multiplexer switch and one isolation component. A detection circuit is simple, a quantity of used isolation components is small, and multiple groups of fan fault feedback signals can be detected simultaneously, reducing costs of the isolation components. Control signals are generated through self-oscillation, and there is no need for a control system to control gating of the multiplexer switch. A level-type feedback signal and a square-wave-type feedback signal can be detected, facilitating compatibility of different fan fault feedback signals.

Embodiment 4

This application further provides another implementation, that is, provides a computer-readable storage medium. The computer-readable storage medium stores computer-readable instructions, and the computer-readable instructions are capable of being executed by at least one processor to enable the at least one processor to perform the steps of the foregoing fan fault detection method.

In this embodiment, a fan fault can be detected by using a multiplexer switch and one isolation component. A detection circuit is simple, a quantity of used isolation components is small, and multiple groups of fan fault feedback signals can be detected simultaneously, reducing costs of the isolation components. Control signals are generated through self-oscillation, and there is no need for a control system to control gating of the multiplexer switch. A level-type feedback signal and a square-wave-type feedback signal can be detected, facilitating compatibility of different fan fault feedback signals.

Based on the description of the foregoing implementations, a person skilled in the art can clearly understand that the method in the foregoing implementations may be implemented by using software and a necessary general-purpose hardware platform. Certainly, hardware may be used, but the former is a better implementation in many cases. Based on this understanding, the technical solution of this application essentially, or a part contributing to the conventional technology, may be embodied in a form of a software product. The computer software product is stored on a storage medium (for example, a ROM/RAM, a magnetic disk, or an optical disc), and includes several instructions to enable a terminal device (which may be a mobile phone, a computer, a server, an air conditioner, a network device, or the like) to perform the method in the implementations of this application.

Apparently, the described embodiments are merely some rather than all of the embodiments of this application. The accompanying drawings provide exemplary embodiments of this application, but are not intended to limit the patentable scope of this application. This application may be implemented in many different forms. On the contrary, these embodiments are provided, so that the disclosure of this application is understood more thoroughly and comprehensively. Although this application is described in detail with reference to the foregoing embodiments, a person skilled in the art may still modify the technical solutions described in the foregoing specific implementations, or perform equivalent replacement on some of the technical features. Any equivalent structure made by using the content of the specification and the accompanying drawings of this application, or directly or indirectly applied to other related technical fields, shall fall within the protection scope of this application.

What is claimed is:

1. A fan fault detection method, comprising the following steps:
configuring a fan type and a rotation speed fault threshold;
generating a clock reference signal through self-oscillation of an oscillator and modulating the clock reference signal into a multi-bit binary signal,
separately gating, by a multiplexer switch, fault detection signals of different fans according to the multi-bit binary signal and outputting, by the multiplexer switch and through an isolation component, an output signal that based on the fault detection signals,
calculating, from the output signal, a fan fault signal frequency f and processing a fan feedback signal flip flag according to configurations of the fan type and the rotation speed fault threshold;
self-adapting to a cycle time of a single fan according to the fan fault signal frequency and the fan feedback signal flip flag;
determining a sequence of a current fan according to an actual cycle time of the single fan through counting by using a time base counter of a digital signal processor (DSP); and
determining a fan type of the current fan according to the fan sequence and the fan type configured during initialization, and determining a fan fault.

2. The fan fault detection method according to claim 1, wherein the step of configuring the fan type and the rotation speed fault threshold specifically comprises:
establishing a correspondence between the fan type and the rotation speed fault threshold, wherein each fan type corresponds to one rotation speed fault threshold.

3. The fan fault detection method according to claim 1, wherein the step of calculating the fan fault signal frequency and processing the fan feedback signal flip flag according to the configurations of the fan type and the rotation speed fault threshold specifically comprises:
calculating a fan feedback signal frequency f according to the configurations of the fan type and the rotation speed fault threshold; and
processing, according to a rule, a flag indicating whether a fan feedback signal is flipped, wherein the rule is resetting the time base counter when a capture event (CEVT) is triggered, and when the CEVT is not triggered, keeping increasing the time base counter to a switching frequency CPU_FRQ of the DSP and then starting counting from 0 again.

4. The fan fault detection method according to claim 1, wherein the self-adapting to the cycle time of the single fan according to the fan fault signal frequency and the fan feedback signal flip flag specifically comprises:
calculating a maximum group quantity of connected fans according to the fan fault signal frequency and the fan feedback signal flip flag, self-adapting to the cycle time of the single fan, and determining a start point of the cycle time of the single fan; and
letting an actual cycle of the single fan be T1 and a design cycle of the single fan be T2, and introducing a coefficient K, wherein $$K = \frac{T1}{T2},$$

and K is consistency between the actual cycle and the design cycle of a feedback signal of the single fan.

5. The fan fault detection method according to claim 3, comprising:

letting the switching frequency of the DSP be CPU_FRQ, setting a register CAP1 to capture a rising edge, setting a register CAP2 to capture a falling edge, setting a register CAP3 to capture a rising edge, and setting a register CAP4 to capture a falling edge, wherein     when an event CEVT1, an event CEVT2, an event CEVT3, and an event CEVT4 are triggered, captured values of the register CAP1, the register CAP2, the register CAP3, and the register CAP4 are respectively TS1, TS2, TS3, and TS4.

6. The fan fault detection method according to claim 1, wherein the step of determining the sequence of the current fan according to the actual cycle time of the single fan through counting by using the time base counter of the DSP specifically comprises:

counting from a cycle start point of the fan feedback signal, wherein     when it is determined, according to the time base counter, which provides a time t, and a cycle Ts, that a count of the actual cycle time of the single fan is K*N, the fan sequence is [t/(K*N)]+1; and     determining a type of a fan in a corresponding sequence according to configuration information of a fan application.

\* \* \* \* \*